(12) United States Patent
Mele

(10) Patent No.: US 6,899,122 B1
(45) Date of Patent: May 31, 2005

(54) SAFETY SHUTOFF APPARATUS AND METHOD

(76) Inventor: Albert Mele, 120 Old Forge Rd., Millington, NJ (US) 07946

(*) Notice: Subject to any disclaimer, the term of this patent is extended or adjusted under 35 U.S.C. 154(b) by 0 days.

(21) Appl. No.: 10/765,196

(22) Filed: Jan. 28, 2004

(51) Int. Cl.⁷ .................. F16K 17/36; F16K 13/08; F16K 31/44

(52) U.S. Cl. .............. 137/312; 122/504; 122/507; 137/2; 137/12; 137/68.11; 251/67; 251/73; 251/74

(58) Field of Search .............. 137/2, 12, 67, 137/68.11, 312, 387; 73/290 R, 299; 122/504, 504.1, 504.2, 507; 222/54; 251/67, 68, 73, 74; 340/604, 605, 614, 616, 626

(56) References Cited

U.S. PATENT DOCUMENTS

| | | | | |
|---|---|---|---|---|
| 1,993,666 A | * | 3/1935 | Gustaf | 137/456 |
| 2,798,503 A | * | 7/1957 | Carver et al. | 137/67 |
| 3,520,314 A | * | 7/1970 | Hirsh | 137/67 |
| 3,791,396 A | * | 2/1974 | Nelson | 137/38 |
| 3,920,031 A | * | 11/1975 | Maxfield | 137/67 |
| 4,294,276 A | * | 10/1981 | Harrison | 137/67 |
| 4,418,712 A | * | 12/1983 | Braley | 137/312 |
| 4,437,482 A | * | 3/1984 | Harrison | 137/67 |
| 4,877,049 A | * | 10/1989 | Fornasari | 137/312 |
| 5,240,022 A | * | 8/1993 | Franklin | 137/312 |
| 5,253,619 A | * | 10/1993 | Richeson et al. | 123/90.12 |
| 5,632,302 A | * | 5/1997 | Lenoir, Jr. | 137/312 |
| 5,713,387 A | * | 2/1998 | Armenia et al. | 137/312 |
| 5,771,916 A | * | 6/1998 | Armenia et al. | 137/67 |
| 6,024,116 A | * | 2/2000 | Almberg et al. | 137/312 |
| 6,170,798 B1 | * | 1/2001 | Johnson et al. | 251/68 |
| 6,186,162 B1 | * | 2/2001 | Purvis et al. | 137/312 |
| 6,206,337 B1 | * | 3/2001 | Veillet, Jr. | 251/67 |
| 6,253,785 B1 | | 7/2001 | Shumake, Jr. et al. | 137/312 |
| 6,336,469 B1 | * | 1/2002 | Nixon et al. | 137/312 |
| 6,533,243 B1 | * | 3/2003 | Sumner et al. | 251/313 |
| 6,543,471 B1 | * | 4/2003 | Carroll | 137/312 |
| 6,792,967 B1 | * | 9/2004 | Franklin | 137/312 |
| 2002/0074042 A1 | * | 6/2002 | Olivas et al. | 137/493.9 |

* cited by examiner

Primary Examiner—George L. Walton
(74) Attorney, Agent, or Firm—Thomas L. Adams

(57) ABSTRACT

Safety shutoff apparatus can close a valve using a pressure operable device coupled to and acting upon the valve. The proximal end of a pressure line is coupled to the pressure operable device for applying fluid pressure thereto in order to operate the pressure operable device. A soluble plug at the distal end of the pressure line can seal it in order to maintain pressure at the pressure operable device. By placing the soluble plug next to an object that is subject to leaking, the soluble plug can dissolve when a leak occurs and release the pressure in the pressure line. The released pressure results in closure of the valve when mechanical movement is produced by the pressure operable device in response to the release of pressure.

42 Claims, 7 Drawing Sheets

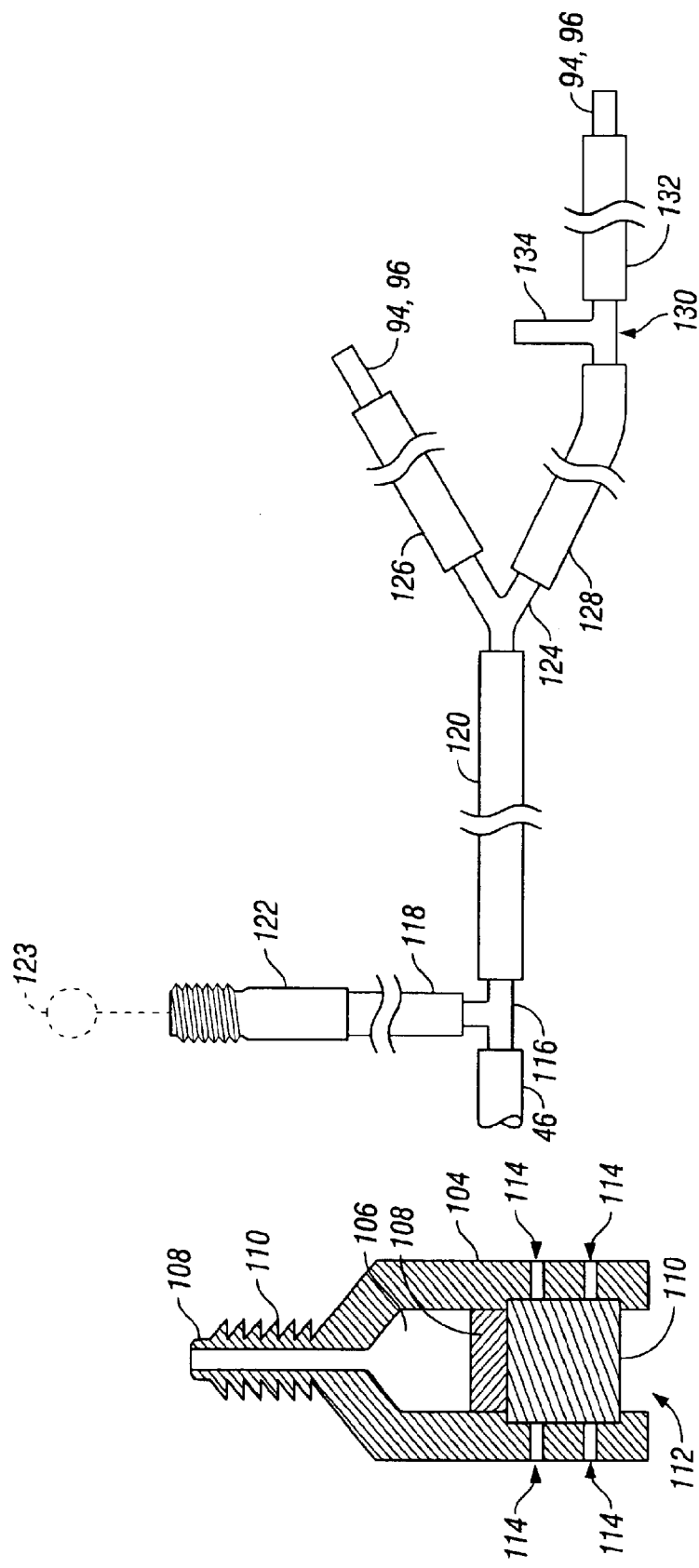

SAFETY SHUTOFF APPARATUS AND METHOD

BACKGROUND OF THE INVENTION

1. Field of the Invention

The present invention relates to safety shutoff apparatus that is able to protect against leaks.

2. Description of Related Art

Appliances such as water heaters, clothes washing machines and the like can spontaneously leak. Leaks can also come from worn or defective valves or from pipes or other plumbing fixtures that burst when frozen. If the owner is absent the leak can cause flooding and substantial damage.

Various emergency shutoff valves have been proposed that employ a water sensor that operates another device that is capable of closing a valve. The drawback with these designs is that the sensors or the shutoff device is relatively complicated and may require an external source of power such as electricity. Also, these devices are not easily adapted to monitoring leaks at remote locations or multiple locations.

In the housing 22 of U.S. Pat. No. 3,920,031 spring biased plunger 26 presses against a plug 30 made of "sugar, salt, or the like." Column 3, lines 20–21. A leak from the water heater can dissolve the plug and pull wire 36 to release catch 68 from the notch 64, so that the valve is shut off by means of coil spring 58.

In U.S. Pat. No. 6,024,116 a valve stem 36 is held in place by flexible fingers 106 that press into grooves 104 and are held in place by a reinforcing paper collar 38. Paper collar 38 is water-soluble and leakage from a hot water heater will soften collar 38 to the point where it will deform or tear and thereby release valve stem 36, thereby closing the valve.

In U.S. Pat. No. 4,877,049 the timer on a washing machine starts an air compressor 16/17 to open hydraulically operated valves 5. Water from a leak lifts float 20 to open electrical contacts 19 and stop air compressor 16/17, thereby closing valves 5. See also U.S. Pat. No. 4,141,533 (solenoid valve actuated to supply pressure to a cylinder that closes a valve).

In U.S. Pat. No. 6,206,337 a retrofit device is clamped to a water supply pipe to operate a shut off valve. A sensor can electrically operate solenoid 35 to release a catch 40 so that spring 32 can swing handle 15 and close valve 60.

In U.S. Pat. No. 5,771,916 leaking water enters a containment chamber of a shut off valve and causes block 82 to expand in order to swing lever 84 and release arm 70 so that spring 78 can close the valve.

In U.S. Pat. No. 6,253,785 float 40 lifts hook 34 to release valve handle 32 so that spring 28 can close shut off valve 24.

In U.S. Pat. No. 4,437,482 a water soluble band 24 that wraps around fingers 26 and 28 can dissolve and release spring-loaded shuttle 18 to close port 20 and prevent water intrusion that may otherwise damage a gas leak detector.

In FIG. 7 of U.S. Patent Application Publication No. U.S. 2002/0074042 a valve designed to close in response to high water flow rates is initially kept open after installation by a water-soluble plug 300.

See also U.S. Pat. No. 5,253,619 (electrically controlled hydraulic actuator operates an engine valve).

Accordingly, there is a need for an improved safety shutoff apparatus that is able to simply and reliably protect against leaks.

SUMMARY OF THE INVENTION

In accordance with the illustrative embodiments demonstrating features and advantages of the present invention, there is provided a safety shutoff apparatus for closing a valve. The apparatus has a pressure operable device coupled to the valve for acting upon the valve. Also included is a pressure line having a distal end and a proximal end. The proximal end of the pressure line is coupled to the pressure operable device for applying fluid pressure thereto in order to operate the pressure operable device. the apparatus also has a soluble plug at the distal end of the pneumatic line for sealing the pressure line in order to maintain pressure through the pressure line at the pressure operable device.

In accordance with another aspect of the invention, a method is provided for closing a valve with a pressure operable device that is coupled to a pressure line whose distal end is sealed with a soluble plug. The method includes the step of pressurizing the pressure line sufficiently to cause the pressure operable device to maintain the valve in an open condition. Another step is contemporaneously placing the soluble plug next to an object that is subject to leaking to allow in response to leaking from the object dissolution of the soluble plug and release of pressure in the pressure line. The method also includes the step of closing the valve when mechanical movement is produced by the pressure operable device in response to pressure being released from the pressure line.

By employing apparatus and methods of foregoing type, an improved safety shutoff apparatus is achieved. In one preferred embodiment, a spring attached to the operating handle of a shutoff valve biases the valve toward a closed condition. A catch engages the valve handle and holds the valve handle in an open position. Preferably, the catch is attached to the piston rod of a pneumatic cylinder that holds the catch in the engaged position so long as the cylinder receives air pressure of about 5 psi. The pressure line attached to the cylinder is routed to the vicinity where a leak may occur. The distal end of the pressure line is sealed with the soluble plug that can dissolve when a leak occurs and release the pressure in the pressure line. In response, the cylinder releases the preferred catch so that the spring can pull the valve handle to the off position.

Embodiments are disclosed in which a torsion spring is used instead of an extension spring in order to directly rotate the valve member. That embodiment can use a cam that is rotated by the pneumatic cylinder away from the valve handle so the torsion spring can close the shutoff valve. Instead of a pneumatic cylinder, other embodiments may use a bellows, a diaphragm, a bladder, and the like.

Some embodiments may employ a pressure line-that has multiple soluble plugs at spaced positions along either a single pressure line or at the ends of multiple branches of the pressure line. These multiple plugs can protect against leaks at different locations in the vicinity of different objects such as a water heater, clothes washer, or other device.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 10 is a detailed, longitudinal sectional view of a device that is an alternate to that of FIG. 8;

FIG. 11 is a plumbing diagram of the pressure line of FIG. 7 with branches fitted with soluble plugs and other devices, and with portions of the pressure line broken away for illustrative purposes;

DETAILED DESCRIPTION OF THE PREFERRED EMBODIMENTS

Figure 1:
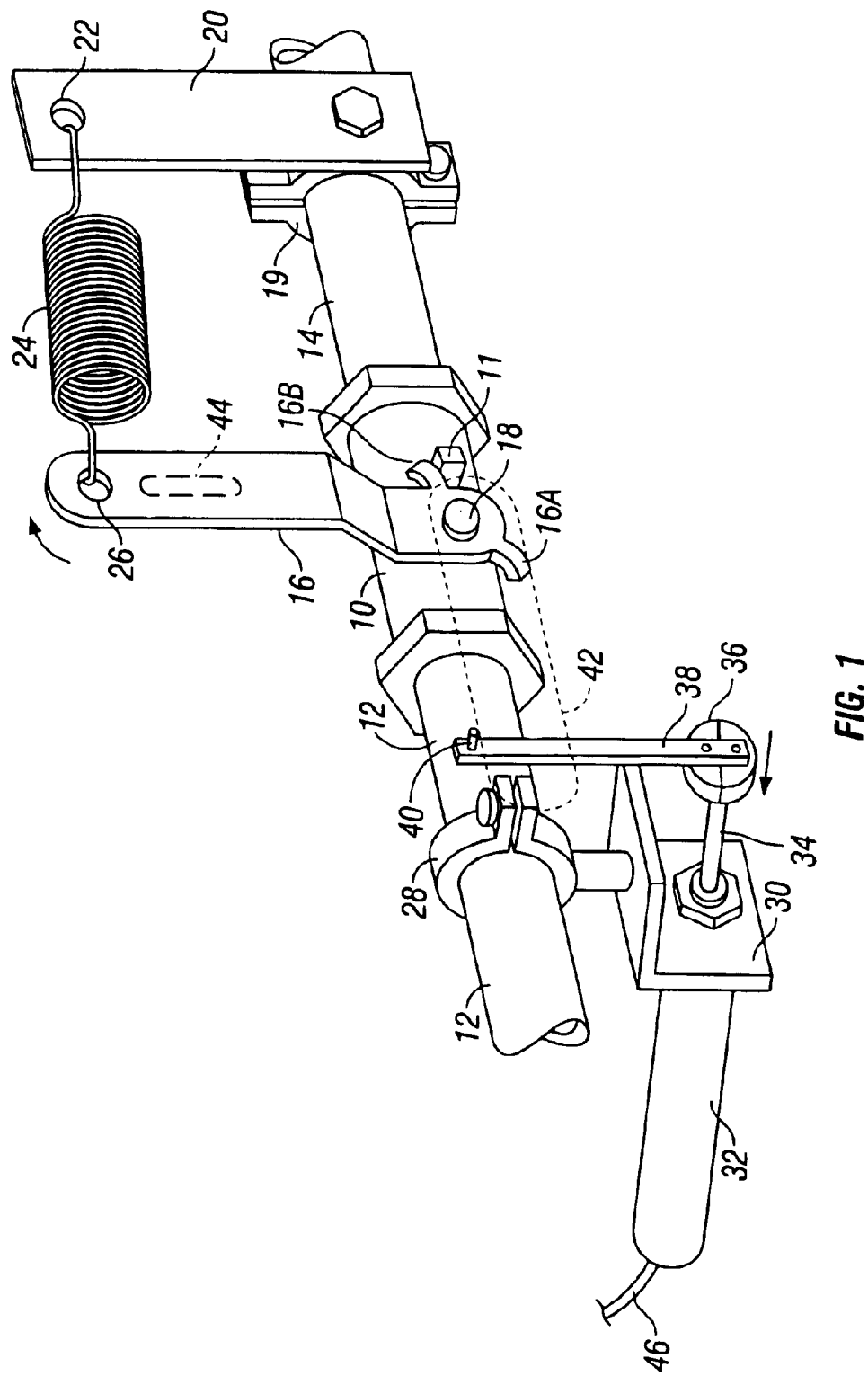
FIG. 1 is a perspective view of a safety shutoff apparatus installed on a water shutoff valve in accordance with principles of the present invention.

Referring to FIG. 1 the illustrated safety shutoff apparatus operates on a shutoff valve 10 coupled between water supply pipes 12 and 14. The valve 10 is operated by a handle 16 that attaches to a movable member 18 of the valve. Handle 16 is shown in the closed condition, the open position being shown in phantom. Handle 16 is shown with angularly spaced arms 16A and 16B that can engage and be stopped by stationary structure 11 on the body of valve 10 when the valve handle is fully open and fully closed, respectively.

A split clamp 19 is bolted around pipe 14. A standoff is shown as a plate 20 bolted to clamp 19 and having an upper hole 22. An extension spring 24 is attached between hole 22 of standoff 20 and hole 26 of handle 16. Spring 24 tends to pull handle 16 into the illustrated closed position and therefore acts as a biasing device.

Another split clamp 28, identical to clamp 19, is secured around pipe 12 to support one branch of L-shaped bracket 30. The other branch of bracket 30 supports pneumatic cylinder 32 that acts as a pressure operable device. Piston rod 34 extending from cylinder 32 is attached to a split clamp 36, which supports an arm 38 in a position transverse to rod 34. The distal end of arm 38 has a transverse pin 40 that acts as a catch. Specifically, when handle 16 is rotated to the open position 42, catch 40 can engage an edge of handle 16 and keep valve 10 in the open condition. While catch 40 is shown engaging an edge of handle 16, in some embodiments the catch may engage a slot other opening in handle 16, for example, the slot 44 shown in phantom in this Figure.

The proximal end of a pneumatic pressure line 46 connects to cylinder 32. A modest pressure of about 5 psi (pounds per square inch) can keep rod 34 extended so that pin 40 remains in a position engaging an edge of handle 16. If the pressure in line 46 is released rod 34 (which is spring biased) retracts so that pin 40 moves axially (that is, in a direction parallel to the axis of rotation of movable member 18). It will be appreciated that pressures other than 5 psi can be employed depending upon the forces involved, the desired immunity from pressure decay, the size of the, pneumatic components, etc.

Figure 2:
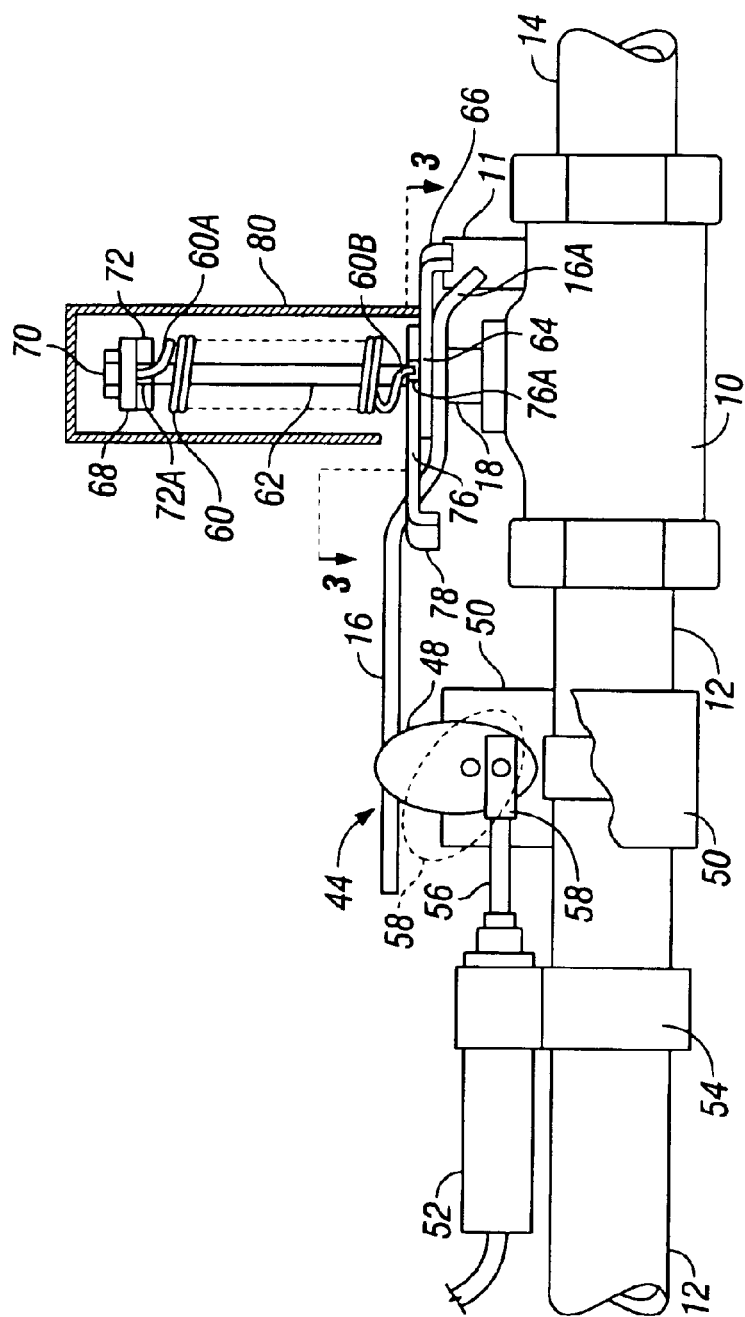
FIG. 2 is a side view of another safety shutoff apparatus that is an alternate to that of FIG. 1.
Figure 3:
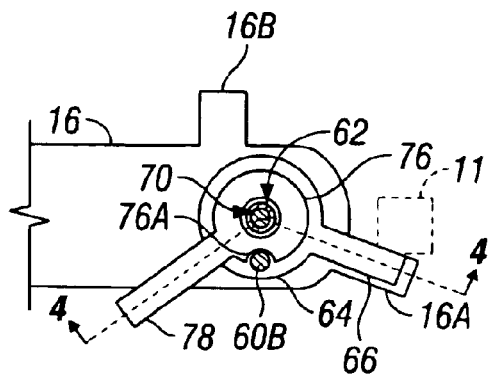
FIG. 3 is a cross-sectional view taken along line 3—3 of FIG. 2 showing an inner portion of a torsion spring drive apparatus with the spring cover removed for illustrative purposes.
Figure 4:
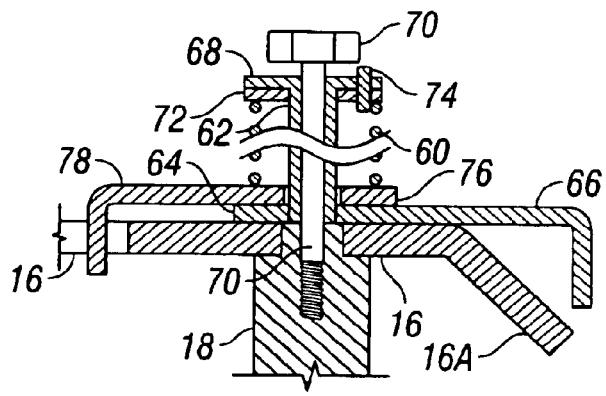
FIG. 4 is a sectional view taken along line 4—4 of FIG. 3.

Referring to FIGS. 2–4, previously mentioned valve 10 is shown connected between pipes 12 and 14. Handle 16 is as before except that previously mentioned slot 44 is in fact implemented in this embodiment. The prominent lobe of cam 48 is shown inserted in slot 44 of handle 16. Cam 48 is pivotally mounted in opposing arms of clamp 50, which is secured to pipe 12. A pneumatic cylinder 52 similar to the one previously described is attached parallel to pipe 12 by clamp 54. Piston rod 56 of cylinder 52 is attached by clevis 58 to cam 48 and can thereby rotate cam 48 into the released position 58 shown in phantom. It will be appreciated that in some embodiments piston rod 56 may retract and thereby rotate cam 48 in the opposite direction. When cam 48 is thus rotated, it leaves slot 44 of handle 16, leaving the handle free to rotate from the illustrated open position.

In this embodiment handle 16, when released, can be rotated to a closed position by torsion spring 60. Torsion spring 60 encircles a spool-like stator comprising a spindle 62 affixed to an inner flange 64. Projecting from inner flange 64 is an abutment arm 66 having a bent tip designed to engage stationary structure 11 on valve 10. Spindle 62 is a slender sleeve capped by an outer flange 68 and rotatably mounted on a bolt 70 that is screwed into movable member 18 of the valve 10. Flanges 68 and 64 are affixed so that they rotate together.

The outer end 60A of torsion spring 60 is captured in a notch 72A of disk 70, which is secured to flange 68 by pin 74. The pin 74 can be removed to change the relative angular orientation between disk 72 and flange 68. For example, a number of angularly spaced apertures in flange 68 accommodate a repositioning of pin 74.

The inner end 60B of torsion spring 60 is captured in a notch 76A of rotor 76. If torsion spring 60 is wound and the outer end 60A is kept fixed, the inner end 60B tends to rotate rotor 76 clockwise (as viewed in FIG. 3). Radially extending from rotor 76 is a driving arm 78 having a bent tip designed to engage an edge of valve handle 16, so that arm 78 can rotate handle 16.

Torsion spring 60 is installed by first setting the angular relationship between disk 72 and flange 68, which establishes the neutral relative angular orientation between the arms 66 and 78 (that is, the angular displacement between arms 66 and 78 when torsion spring 60 is unwound to the extent possible). Next, torsion spring 60 is wound by rotating arm 78 counterclockwise relative to arm 66 (as viewed in FIG. 3).

While arms 66 and 78 are kept in this wound position, bolt 70 is screwed into movable member 18 with arms 66 and 78 abutting elements 11 and 16, respectively, as shown in FIGS. 2–4. Consequently, torsion spring 60 will tend to drive arm 66 into abutment with stationary structure 11, while arm 78 will engage in an edge of valve handle 16 and will tend to drive handle 16 to a closed position. Once the torsion spring 60 is thus installed, cover 80 may be placed over the spring. Accordingly, when rod 56 extends and rotates cam 48 out of slot 44, torsion spring 60 can rotate arm 78 to drive handle 16 into a closed position.

Figure 5:
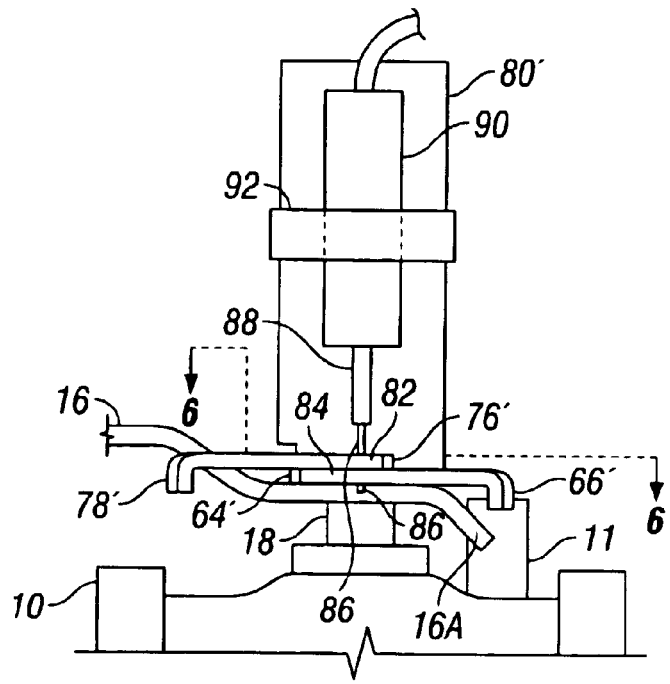
FIG. 5 is a side view of another safety shutoff apparatus that is an alternate to that of FIG. 2 with portions of the valve broken away for illustrative purposes.
Figure 6:
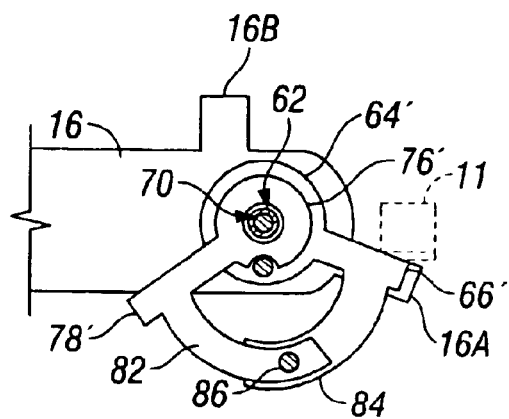
FIG. 6 is a cross-sectional view taken along line 6—6 of FIG. 5.

Referring to FIGS. 5 and 6, elements identical to those shown in FIGS. 2–4 have the same reference numerals, while elements only similar to those shown in FIGS. 2–4 have the same reference numerals but marked with a prime ('). In particular, the previously described torsion spring (spring 60 of FIG. 2) is mounted as before inside cover 80' with spindle 62 rotatably mounted on bolt 70, which is threaded into movable member 18.

Here however, the torsion spring drives a modified rotor 76' and spindle 70 is affixed to a modified flange 64'. In particular, rotor 76' has a modified driving arm 78' that supports an integral spur 82. The modified flange 64' has a modified abutment arm 66' that supports an integral spur 84. Spurs 82 and 84 project toward each other and are shown overlapping in FIG. 6. Spurs 82 and 84 each have a distal hole, which holes are shown receiving pin 86 in FIG. 6. Pin 86 is attached to piston rod 88 of pneumatic cylinder 90, which is held by strap 92 to cover 80'. Accordingly, cylinder 90 can retract pin 86 so that arm 78' is free to rotate and drive valve handle 16 from the illustrated open position 90° to a closed position.

Figure 8:
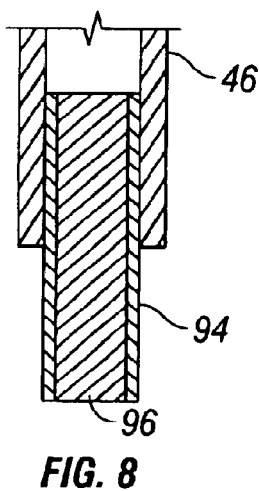
FIG. 8 is a detailed, longitudinal sectional view of a soluble plug in a sleeve installed in the distal end of a pressure line.

Referring to FIG. 8, sleeve 94 is inserted into the distal end of previously mentioned pressure line 46. Line 46 may be a flexible hose made of rubber, silicone, or other materials. The sleeve 94 may be a short section of tubing made of a metal (e.g., copper), plastic, or other materials.

A soluble plug 96 is sealed inside sleeve 94. Plug 96 may be made by finely grinding a soluble material, which is then wetted to form a paste that is then pressed into sleeve 96 and allowed to dry. Instead of forming a paste, some ground materials can be poured into sleeve 94 and compressed into a solid mass. In still other embodiments, the plug 96 can be formed in a separate mold and then inserted into sleeve 94.

It is desirable to coat the inside of sleeve 94 with a sealant such as an adhesive to prevent leaks between plug 96 and sleeve 94. Plug 96 can be made of any one of a variety of soluble substances such as aspirin, sugar, salt, etc. that can dissolve in water and thereby release the pressure inside line 46. For embodiments that are designed to respond to fluids other than water, plug 96 will be chosen to be soluble in that other fluid.

In some embodiments, sleeve 94 may be eliminated and plug 96 may be made with a diameter that allows plug 96 to be snugly inserted into pressure line 46 in order to close and seal the pressure line 46.

Figure 9:
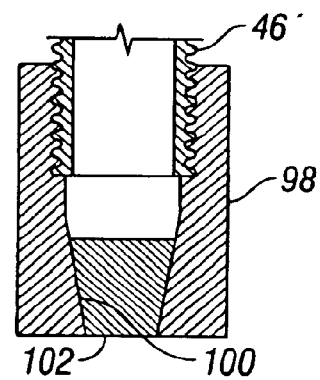
FIG. 9 is a detailed, longitudinal sectional view of a device that is an alternate to that of FIG. 8.

Referring to FIG. 9, pressure line 46' is modified to have external threads on its distal end. An alternate sleeve 98 is internally threaded at its proximal end to receive line 46'. Sleeve 98 has on its distal end an inwardly diverging throat 100 that is preferably frustoconical. A frustoconically shaped soluble plug 102 is sealingly fitted in frustoconical throat 100. Plug 102 may be formed in a manner similar to that previously described in connection with FIG. 8.

Since plug 102 and throat 100 are similarly tapered, pressure applied from line 46' will tend to press plug 102 outwardly, which will tend to wedge the plug more tightly in throat 100, thereby producing a tighter seal.

Referring to FIG. 10, another sleeve 104 has an inner chamber 106 that converges into a male fitting 108 with an axially spaced plurality of annular barbs 110 designed to seal inside a flexible hose (e.g., hose 46). A stopper 108 is slidably mounted inside chamber 106. A soluble plug 110 is fitted inside a larger outer chamber 112 that communicates with inner chamber 106. The side walls of chamber 112 are perforated by a plurality of side orifices 114, which increase the exposure of soluble plug 110.

With this arrangement, water or other fluids can gain access to soluble plug 110 through the side orifices 114 or through the large distal opening in sleeve 104. Once plug 110 has dissolved, the pressure in chamber 106 ejects stopper 108 and the pressure in chamber 106 is discharged through orifices 114 or the open distal end of sleeve 104. This arrangement has the advantage that plug 110 does not need to provide the sealing function, but merely needs to hold in place stopper 108, which then performs the sealing function.

Referring to FIG. 11, previously mentioned pressure line 46 is shown connected to one branch of T fitting 116, whose other two branches are connected to lines 118 and 120 so that line 46 can communicate with those lines. The distal end of line 120 connects to one branch of a Y fitting, whose other two branches connect to lines 126 and 128. The distal end of line 128 connects to one branch of T fitting 130 whose opposite branch connects to line 132. The other branch 134 of T fitting 130 is a port with a soluble seal and may be a structure similar to the sleeve 94 and soluble plug 96 described in connection with FIG. 8. The distal ends of lines 126 and 132 are also ports with soluble seals and may be fitted with a sleeve 94 and soluble plug 96 as was described in connection with FIG. 8.

Line 118 is used as a service branch and connects to a fitting 122 that is built like the valves found on the inner tubes used in automobile or bicycle tires. Accordingly, fitting 122 can be used with a pressure source 123 (e.g., a bicycle pump) to pressurize lines 46 and 120, which will in turn pressurize the branches served by lines 126 and 128.

To facilitate an understanding of the principles associated with the foregoing apparatus, its operation will be briefly described in connection with the embodiment of FIG. 1 and the layout diagram of FIG. 7. It will be appreciated that the other embodiments of FIGS. 2–6 will operate in a similar manner.

If the apparatus of FIG. 1 is installed as shown, handle 16 is held in the closed position by extension spring 24. Assuming there is no pressure in line 46, rod 34 will be retracted by cylinder 32 so that pin 40 is retracted as well. Accordingly, handle 16 can be swung 90° to the closed position 42 without interference.

Next, pressure is applied to line 46 causing rod 46 to extend so that pin 40 will extend over the edge of handle 16 thereby holding it in the open position 42 against the urging of spring 24. If rod 34 and pin 40 were already extended before the handle 16 is swung to the open position 42, the user may temporarily remove pin 40 so that handle 16 can be swung to the open position 42 before reinstalling pin 40.

Figure 7:
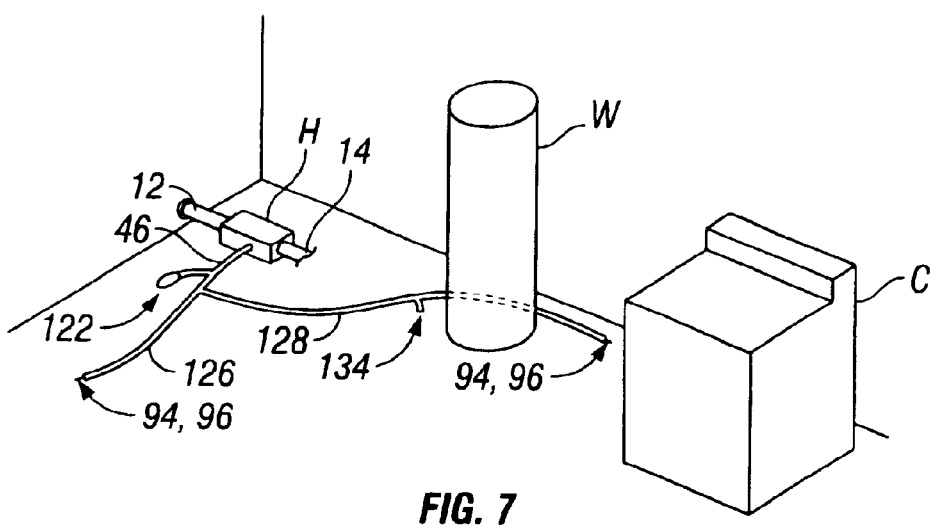
FIG. 7 is a schematic perspective view of the overall installation of the apparatus of FIG. 1 or its alternatives.

In FIG. 7 previously mentioned pipe 12 is shown as a water supply connected to a water main outside the building. The apparatus illustrated in FIG. 1 is hidden inside housing H in FIG. 7. Previously mentioned pipe 14 is shown as an outlet that can supply water to various objects, such as a water heater W or clothes washing machine C.

Line 46 is shown communicating with first branch 128, which has a first port 134 with a soluble seal and a second port 94 with a soluble seal 96. Port 134 is adjacent to water heater W while port 94 is adjacent to clothes washing machine C. The second branch 126 terminates in a port 94 having a soluble seal 96 that can respond to water in another vicinity; for example, to water that may overflow from a sink at this level or some upper level.

If water leaks from one of the objects W or C or elsewhere, the soluble seal in one of the previously mentioned ports will dissolve. For the ports shown in FIGS. 8 and 9 the soluble plugs will simply progressively erode until so weakened that internal pressure will simply dislodge the remaining plug fragment. For the embodiment of FIG. 10 dissolution of plug 110 will allow stopper 108 to be ejected by the pressure inside chamber 106.

Once the soluble plug dissolves, the pressure is released in lines 46, 126, and 128. Consequently, cylinder 32 (FIG. 1) retracts rod 34 under the urging of its internal spring (not shown). This retraction causes catch 40 to retract away from and release handle 16. Next, spring 24 is able to swing handle 16 to the closed position shown in FIG. 1. This shuts off the supply of water so that no further leakage can occur through objects W and C.

Once the leak is repaired, a new soluble plug can be installed in the affected port. For the embodiment of FIG. 8 empty sleeve 84 is removed and replaced with another sleeve that contains an intact soluble plug. A similar replacement is performed if the affected port is the in-line fitting 130 (FIG. 11). For the embodiment of FIG. 9 empty sleeve 98 is unthreaded and replaced with a new sleeve containing an intact plug. For the embodiment of FIG. 10 male fitting 108 is pulled from the associated pressure line so that a new port can be installed.

Once the soluble seals have been repaired, the user can attach a pump to fitting 122 and repressurize lines 46, 126 and 128. Thereafter the handle 16 (FIG. 1) can be moved to the open position 42 in the manner previously described. (Alternatively, the handle 16 can be swung to the open position 42 before the lines are repressurized, also in the manner previously described.)

Figure 12:
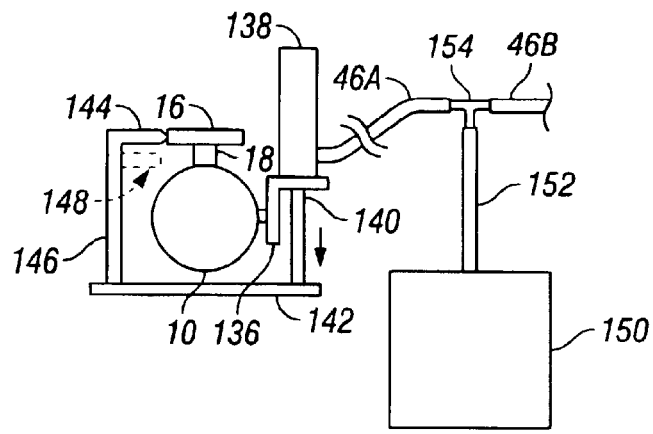
FIG. 12 is a schematic diagram of an apparatus that is an alternate to that of FIG. 1.

Referring now to FIG. 12, previously mentioned valve 10 is shown with its movable member 18 connected to previously mentioned valve handle 16. A bracket 136 is clamped to one of the pipes connected to valve 10 in a manner similar to that shown in FIG. 1. A pneumatic cylinder 138 is supported on bracket 136 with its piston rod 140 connected to beam 142. Post 146 on beam 142 supports a catch 144, which is shown bearing against an edge of valve handle 16 to hold it in the open position.

In a manner similar to that previously described, the release of pressure in line 46A causes elements 140, 142 and 146 to move in the indicated direction. Consequently, catch 144 will move to position 148, thereby releasing handle 16. One of the spring biasing mechanisms disclosed previously can be used now to swing handle 16 to a closed position.

In some cases, the pressure in line 46A may diminish over time due to minute leaks, chemical absorption of the air in the lines, stretching of components, etc. Although one can periodically repressurize the lines in the manner previously described, this embodiment employs an accumulator 150 connected by line 152 to one of the branches of T fitting 154, whose other two branches connect to lines 46A and 46B. Accumulator 150 is a passive device offering a supply of air that maintains the pressure in the lines 46A and 46B.

Figure 13:
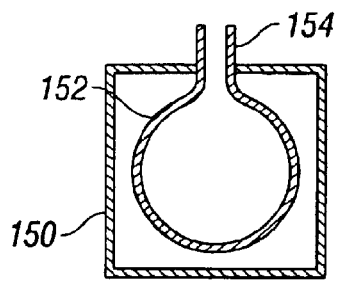
FIG. 13 is a cross-sectional diagram of an accumulator that may communicate with components described herein.

Referring to FIG. 13, accumulator 150 is shown as a chamber containing an inflatable member 152 having a nipple 154 projecting through a wall of chamber 150. Member 152 can be initially inflated, causing member 152 to stretch. This produces a pressure at nipple 154 as a consequence of air pressure on the inside and outside of member 152, as well as the elasticity of member 152. Therefore, if the system has a minute leak, member 152 can partially deflate supplying the missing air and maintaining a relatively constant pressure in the system.

Figure 14:
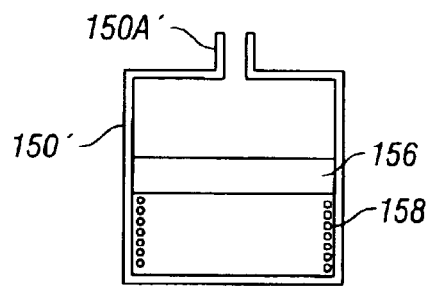
FIG. 14 is a cross-sectional diagram of an accumulator that is an alternate to that of FIG. 13.

An alternate accumulator shown in FIG. 14 has a chamber 150' with a nipple 150A'. A piston 156 is slidably mounted inside chamber 150' and is biased in a direction towards nipple 150A' by a compression spring 158. As before, air lost from the system by minute leaks or other factors can be replaced as spring-biased piston 156 is driven towards nipple 150A' by spring 158. Again, the accumulator 150' maintains relatively constant pressure in the system.

Figure 15:
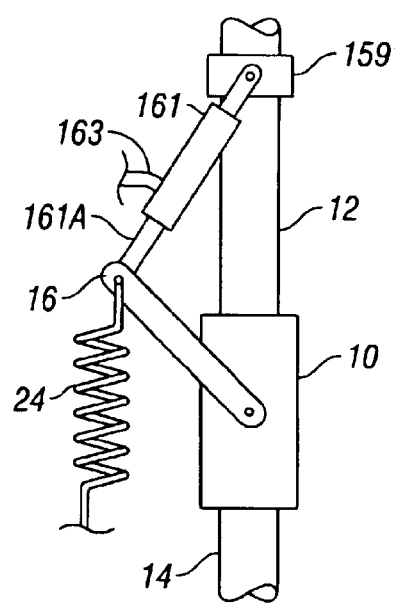
FIG. 15 is a schematic diagram of an apparatus that is an alternate to that of FIG. 1.

Referring to FIG. 15, previously mentioned valve 10 is shown coupled between pipes 12 and 14 and controlled by operating handle 16, as before. In a manner similar to that described in FIG. 1 an extension spring 24 can bias handle 16 toward the closed position (transverse to pipes 12 and 14).

In this embodiment a pneumatic cylinder 161 is pivotally supported on pipe 12 by pipe clamp 159. The cylinder's piston rod 161A is pivotally connected to the distal end of handle 16. When cylinder 161 is driven by pressure in line 163, piston rod 161A fully retracts and keeps handle 16 in the open position, parallel to pipes 12 and 14. Should pressure be released in line 163 in the manner previously described, piston rod 161A will be free to extend as spring 24 pulls handle 16 into the closed position transverse to pipes 12 and 14.

Figure 16:
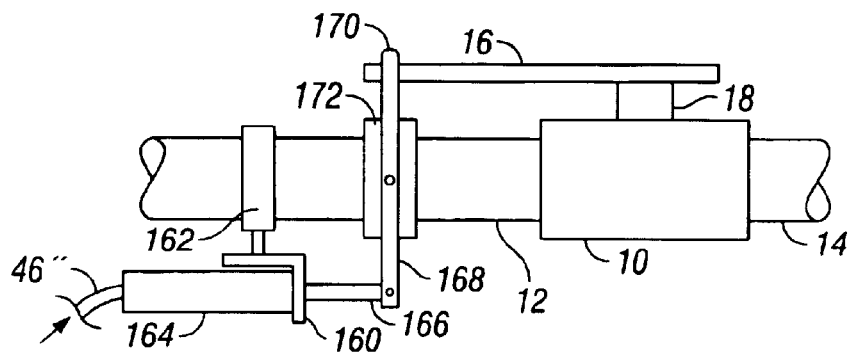
FIG. 16 is a schematic diagram of an apparatus that is an alternate to that of FIG. 1.

Referring to FIG. 16, previously mentioned valve 10 is shown with its movable member 18 connected to previously mentioned valve handle 16. The pipe 12 connected to valve 10 supports a bracket 160 by means of pipe clamp 162, which is constructed in the same manner as the pipe clamps of FIG. 1. A pneumatic cylinder 164 is attached to bracket 160 with its piston rod 166 pivotally connected to one end of lever 168, whose opposite end 170 acts as a catch that bears against an edge of handle 16 to hold it in the illustrated open position. Lever 168 is pivoted on a clamp 172 that is located between valve 10 and clamp 162.

When pressure is released from line 46" piston rod 166 retracts to rotate lever 168 clockwise until catch 170 is released from the edge of handle 16, allowing a spring mechanism (not shown, but similar to those previously described) to drive handle 16 from the illustrated open position to a closed position. It will be appreciated that the pressure release may in some embodiments cause rod 166 to extend and rotate lever 168 counterclockwise to release handle 16.

Figure 17:
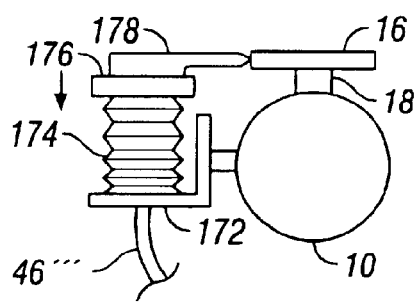
FIG. 17 is a schematic diagram of an apparatus that is an alternate to that of FIG. 1.

Referring to FIG. 17, previously mentioned valve 10 is shown with its movable member 18 connected to previously mentioned valve handle 16. A bracket 172 is attached to a pipe associated with valve 10 in a manner similar to that previously described. One end of bellows 174 is mounted on bracket 172 and the other end is the attached to a platform 176 that supports catch 178 whose outer end engages the edge of valve handle 16, keeping it in the illustrated open position.

When pressure is released from line 46'" bellows 174 collapses in the indicated direction, thereby releasing catch 178 from valve handle 16, allowing it to be driven to a closed position under the urging of a spring mechanism (not shown, but similar to the spring mechanisms previously illustrated).

Figure 18:
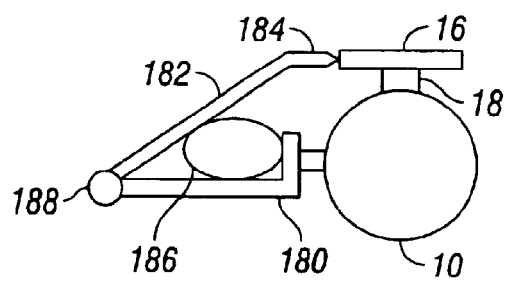
FIG. 18 is a schematic diagram of an apparatus that is an alternate to that of FIG. 1.

Referring to FIG. 18, previously mentioned valve 10 is shown with its movable member 18 connected to previously mentioned valve handle 16. A bracket 180 having an L-shaped cross-section is attached to a pipe associated with valve 10 in a manner similar to that previously described. Hinged to the distal edge of bracket 180 is an arm 182 whose distal end has a catch 184 engaging an edge of valve handle 16 and keeping it in the illustrated open position. Captured between bracket 180 and arm 182 is a bladder 186 that has a nipple (not shown) that connects to the previously mentioned pressure line (for example, pressure line 46 of FIG. 7).

When pressure is released from the pressure line, bladder 186 deflates and allows arm 182 to swing toward bracket 182. Arm 182 may be driven in this direction by a torsion spring 188 located at the hinge between bracket 180 and arm 182. The rotation of arm 182 will release catch 184 from handle 16 and allow it to swing to the closed position under the urging of a spring (not shown, but similar to the spring mechanisms previously illustrated).

Figure 19:
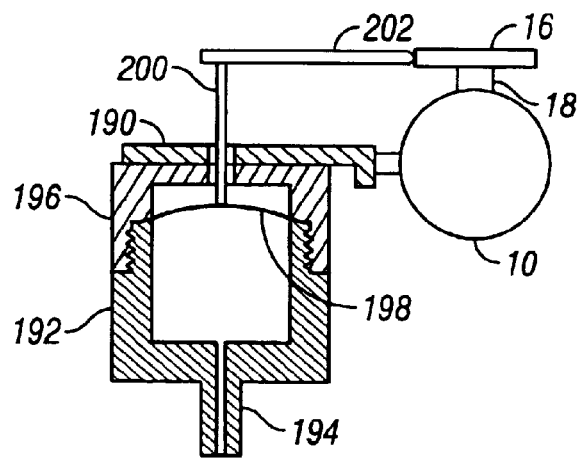
FIG. 19 is a schematic diagram of an apparatus that is an alternate to that of FIG. 1.

Referring to FIG. 19, previously mentioned valve 10 is shown with its movable member 18 connected to previously mentioned valve handle 16. A bracket 190 is attached to a pipe associated with valve 10 in a manner similar to that previously described. A cover 196 is threaded onto one end of vessel 192 whose other end has a nipple 194. A diaphragm 198 is sealingly captured between cover 196 and vessel 192. A post 200 attached to the center of diaphragm 198 projects through aligned holes in cover 196 and bracket 190. The distal end of post 200 supports a catch 202 that engages the edge of handle 16 to hold it in the illustrated open position.

When pressure is released through the nipple 194, diaphragm 198 is no longer distended and pulls post 200 inwardly, thereby releasing catch 202 from handle 16 and allowing it to swing to the closed position under the urging of a spring (not shown, but similar to the spring mechanisms previously illustrated).

It is appreciated that various modifications may be implemented with respect to the above described, preferred embodiments. While the foregoing contemplates protecting against leakage of water, other embodiments may have plugs that are soluble in other fluids in order to protect against spills and leakage of that other fluid. Instead of helical springs, other embodiments may obtain a yielding or elastic effect by employing elastic members, leaf springs, air compression devices, permanent magnets, etc. Also, in some embodiments a discrete spring will be unnecessary if the pneumatic cylinder or other pressure operated device has an internal return spring. The foregoing embodiments acted upon an elongated handle, but some embodiments may apply torque directly to the valve's movable member. Also, the foregoing apparatus can be adapted to valves that are controlled by a nonrotating member, such as a slide. Furthermore, in some embodiments components inside the valve body may bias the valve toward a closed position without the need for external biasing components. Likewise, pressure operated components may be placed inside the valve body in order to release the valve or drive the valve into a closed condition. Also for embodiments that require a higher degree of sensitivity, the soluble plug may react with the leaked fluid and quickly break down by a chemical reaction, effervescence, etc. Also, the catch mechanisms may be actuated through a variety of links or transmissions, such as gear trains, pulleys, chains, etc. Moreover, the pressure lines may contain any variety of compressed gases or other fluids, not just compressed air. Furthermore, the magnitude of the pressure under normal unreleased conditions can be much greater or much less than 5 psi. Moreover, some embodiments may employ a negative pressure (partial vacuum) that is released when a soluble plug dissolves (therefore, the term "pressure" as used herein refers to both positive and negative pressure). In addition, the size and shape of various components can be altered depending upon the desired strength, speed of operation, structural integrity, thermal stability, etc.

Obviously, many modifications and variations of the present invention are possible in light of the above teachings. It is therefore to be understood that within the scope of the appended claims, the invention may be practiced otherwise than as specifically described.

What is claimed is:

1. A safety shutoff apparatus for closing a valve disposed between a fluid supply and a utilization device, comprising:
   a pressure operable device coupled to said valve for acting upon said valve to affect at least one of an open and closed position thereof;
   a pressure line having a distal port and a proximal end, the proximal end of said pressure line being coupled to said pressure operable device for applying fluid pressure thereto in order to operate said pressure operable device to affect the at least one of the open and closed positions; and
   a soluble plug at the distal port of said pressure line for sealing said pressure line in order to maintain the at least one of said open and closed positions, wherein when the pressure through said pressure line at said pressure operable device is altered due to water discharge occurring at the utilization device that causes a dissolution of the soluble plug from sealing engagement in said pressure line.

2. A safety shutoff apparatus according to claim 1 wherein said pressure operable device is operable to keep said valve open in response to pressure in said pressure line exceeding 5 psi.

3. A safety shutoff apparatus according to claim 1 wherein said pressure line is longer than 30 cm.

4. A safety shutoff apparatus according to claim 1 wherein said pressure line has a first port and a second port communicating with said pressure operable device, said soluble plug including a first and a second soluble seal mounted at said first and said second port, respectively.

5. A safety shutoff apparatus according to claim 1 wherein said pressure line has a first branch and a second branch communicating with said pressure operable device, said soluble plug including a first and a second soluble seal mounted distally in said first and said second branch, respectively.

6. A safety shutoff apparatus according to claim 1 wherein said pressure line has a service branch terminating with a fitting adapted to connect to a source for pressurizing said pressure line.

7. A safety shutoff apparatus according to claim 1 comprising:
   a pump for pressurizing said pressure line.

8. A safety shutoff apparatus according to claim 1 comprising:
   a sleeve attached to said pressure line, said soluble plug being mounted in said sleeve.

9. A safety shutoff apparatus according to claim 8 wherein said sleeve has an internal seal coating for sealing said soluble plug to said sleeve.

10. A safety shutoff apparatus according to claim 8 wherein said sleeve has a fitting for coupling said sleeve to said pressure line.

11. A safety shutoff apparatus according to claim 8 wherein said sleeve has a
   fitting for detachably coupling said sleeve to said pressure line.

12. A safety shutoff apparatus according to claim 8 wherein said sleeve has an inner chamber and a larger outer chamber, said soluble plug being mounted in said larger outer chamber, said safety shutoff apparatus comprising:
   a stopper slidably mounted in said inner chamber between said soluble plug and said pressure line.

13. A safety shutoff apparatus according to claim 8 wherein said sleeve has an inwardly diverging throat containing said soluble plug.

14. A safety shutoff apparatus according to claim 8 wherein said sleeve has a plurality of side orifices.

15. A safety shutoff apparatus according to claim 1 comprising:
a biasing device for urging said valve to close.

16. A safety shutoff apparatus according to claim 1 comprising:
a catch for normally preventing closure of said valve, said pressure operable device being operable to release said catch and allow closure of said valve.

17. A safety shutoff apparatus according to claim 16 comprising:
a spring for urging said valve to close.

18. A safety shutoff apparatus according to claim 16 wherein said valve has a rotatable operating handle with an opening, said catch normally engaging said opening in said handle, said catch being retractable from said opening to release said handle.

19. A safety shutoff apparatus according to claim 16 wherein said valve has a rotatable operating handle, said catch comprising:
a pin mounted to retract relative to said handle in an axial direction.

20. A safety shutoff apparatus according to claim 16 wherein said valve has a rotatable operating handle, said catch comprising:
a cam rotatably driven by said pressure operable device to retract relative to said handle.

21. A safety shutoff apparatus according to claim 16 wherein said valve has a rotatable operating handle, said catch comprising:
a lever rotatably driven by said pressure operable device to retract relative to said handle.

22. A safety shutoff apparatus according to claim 16 wherein said pressure operable device comprises a pneumatic cylinder.

23. A safety shutoff apparatus according to claim 1 wherein said valve has an operating handle, said safety shutoff apparatus comprising:
a spring coupled to said handle for urging said valve to close.

24. A safety shutoff apparatus according to claim 23 wherein said spring is an extension spring coupled to said handle to swing it.

25. A safety shutoff apparatus according to claim 24 wherein said valve has a pipe, said safety shutoff apparatus comprising:
a standoff adapted to clamp to said pipe, said spring being stretched between said standoff and said handle.

26. A safety shutoff apparatus according to claim 1 comprising:
a torsion spring mounted to apply a torque to said valve in a manner that tends to close said valve.

27. A safety shutoff apparatus according to claim 26 wherein said valve has a movable member, said safety shutoff apparatus comprising:
a stator mounted at said valve with restricted ability to rotate, said stator having an inner and an outer flange; and
a rotor mounted about said stator adjacent said inner flange, said torsion spring being mounted on said stator and being coupled between said outer flange and said rotor in order to drive them toward a neutral relative angular orientation, said rotor being coupled to said movable member of said valve, said spring being mounted in a position tending to rotate said movable member of said valve in a predetermined direction.

28. A safety shutoff apparatus according to claim 27 wherein said spring can be angularly adjusted to change the angular orientation between said outer flange and said rotor when in the neutral relative angular orientation.

29. A safety shutoff apparatus according to claim 28 wherein said stator has an abutment arm to engaging stationary structure on said valve, said rotor having a driving arm for engaging the movable member of said valve.

30. A safety shutoff apparatus according to claim 1 wherein said pressure operable device comprises a pneumatic cylinder.

31. A safety shutoff apparatus according to claim 1 wherein said pressure operable device comprises a bellows.

32. A safety shutoff apparatus according to claim 1 wherein said pressure operable device comprises a bladder.

33. A safety shutoff apparatus according to claim 1 wherein said pressure operable device comprises a vessel with an inlet and a diaphragm, said vessel being pressurizable through said inlet to distend said diaphragm.

34. A safety shutoff apparatus according to claim 1 comprising:
an accumulator for stabilizing pressure in said pressure line.

35. A safety shutoff apparatus according to claim 34 wherein said accumulator comprises:
a chamber having an inflatable member.

36. A safety shutoff apparatus according to claim 34 wherein said accumulator comprises:
a chamber having a spring biased piston.

37. A method for closing a valve disposed between a fluid supply and a utilization device, said valve cooperatively associated with a pressure operable device that is coupled to a pressure line having a distal port sealed with a soluble plug, comprising the steps of:
pressurizing said pressure line sufficiently to cause the pressure operable device to maintain the valve in an open condition;
contemporaneously placing the soluble plug next to an object that is subject to leaking to allow in response to leaking from said object dissolution of said soluble plug and release of pressure in said pressure line; and
closing the valve when mechanical movement is produced by the pressure operable device in response to pressure being released from said pressure line.

38. A method according to claim 37 comprising the step of:
routing said pressure line with at least two branches serving different objects subject to leaking, each of the branches being sealed with a soluble plug.

39. A method according to claim 37 wherein the pressure line has at least two soluble plugs, the method comprising the step of:
routing said pressure line with the at least two soluble plugs serving different objects that are subject to leaking.

40. A method according to claim 37 wherein the step of pressurizing the pressure line is performed by creating a pressure of no more than 5 psi.

41. A method according to claim 37 comprising the step of:
periodically repressurizing the pressure line.

42. A method according to claim 37 wherein the valve is biased to close, the method comprising the step of:
placing a catch in a position to prevent closing of the valve, and
releasing the catch using the pressure operable device.

* * * * *